US 7,711,721 B2

(12) United States Patent
Dearing et al.

(10) Patent No.: US 7,711,721 B2
(45) Date of Patent: May 4, 2010

(54) APPARATUS, SYSTEM, AND METHOD FOR SUSPENDING A REQUEST DURING FILE SERVER SERIALIZATION REINITIALIZATION

(75) Inventors: Gerard Maclean Dearing, San Jose, CA (US); William Stuart Edwards, San Jose, CA (US); Elmer Enrique Latorre, San Jose, CA (US); Thomas Alexander Mahon, San Jose, CA (US); Lyle LeRoy Merithew, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 10/932,201

(22) Filed: Sep. 1, 2004

(65) Prior Publication Data
US 2006/0047686 A1    Mar. 2, 2006

(51) Int. Cl.
*G06F 17/00* (2006.01)
(52) U.S. Cl. ............... 707/703; 707/999.009; 707/999.01; 707/999.201; 709/211; 709/215; 709/216; 709/223; 709/224; 709/225; 709/229; 711/119; 711/120; 711/142; 711/161; 711/162
(58) Field of Classification Search .......... 707/3–5, 707/10, 100, 102, 8, 9, 201; 711/162, 119, 711/120, 142, 161; 709/203, 211, 215, 216, 709/223, 224, 225, 229; 713/155
See application file for complete search history.

(56) References Cited

U.S. PATENT DOCUMENTS

| | | | |
|---|---|---|---|
| 4,819,159 A * | 4/1989 | Shipley et al. ............. 714/19 |
| 5,095,421 A | 3/1992 | Freund ..................... 718/101 |
| 5,185,871 A | 2/1993 | Frey et al. ................. 710/200 |
| 5,193,188 A * | 3/1993 | Franaszek et al. ........... 707/8 |
| 5,490,270 A | 2/1996 | Devarakonda et al. ..... 707/201 |
| 5,504,900 A * | 4/1996 | Raz ........................... 707/10 |
| 5,664,088 A | 9/1997 | Romanovsky et al. ....... 714/13 |

(Continued)

OTHER PUBLICATIONS

Minwen Ji, "Atomicity, serialization and recovery in the island-based file sytem", INSPEC—6806009; Proceedings IEEE International Conference on Cluster Computing. CLUSTER 2000, pp. 369-370, Published: Los Alamitos, CA, USA, 2000.xxvii + 406 pp.

(Continued)

*Primary Examiner*—Isaac M Woo
*Assistant Examiner*—Syling Yen
(74) *Attorney, Agent, or Firm*—Kunzler Needham Massey & Thorpe (57) ABSTRACT

An apparatus, system, and method are disclosed for suspending a data access request during serialization reinitialization of a file server. The apparatus includes a request recognition module, an availability module, and a suspension module. The request recognition module recognizes a request to be processed by a file server. The availability module determines if the file server is available. The suspension module suspends the data access request if the file server is not available due to serialization reinitialization. In one embodiment, the suspension module implements a hardware interrupt delay loop to suspend an interruptible data access request, such as an application request. In another embodiment, the suspension module queues a non-interruptible data access request and notifies the operating system, for example, that the non-interruptible request has been initiated. One advantage of various embodiments of the present invention is to allow interruptible and non-interruptible data access requests to be suspended during serialization reinitialization and processed promptly after the serialization information is reinitialized.

18 Claims, 8 Drawing Sheets

U.S. PATENT DOCUMENTS

| | | | | |
|---|---|---|---|---|
| 5,752,060 | A | 5/1998 | Yoshida | 707/10 |
| 5,845,117 | A | 12/1998 | Fujita | 718/107 |
| 5,950,218 | A * | 9/1999 | Howard | 711/4 |
| 5,960,436 | A | 9/1999 | Chang et al. | 707/101 |
| 6,115,710 | A * | 9/2000 | White | 707/10 |
| 6,151,655 | A * | 11/2000 | Jones et al. | 710/244 |
| 6,192,389 | B1 | 2/2001 | Ault et al. | 718/101 |
| 6,351,744 | B1 | 2/2002 | Landresse | 707/8 |
| 6,442,551 | B1 * | 8/2002 | Ofek | 707/10 |
| 6,658,415 | B1 * | 12/2003 | Brown et al. | 707/10 |
| 6,665,814 | B2 | 12/2003 | Hobson et al. | 714/16 |
| 6,732,124 | B1 * | 5/2004 | Koseki et al. | 707/202 |
| 6,751,617 | B1 | 6/2004 | Anfindsen | 714/13 |
| 6,886,064 | B2 | 4/2005 | Dawkins et al. | 710/200 |
| 6,920,467 | B1 * | 7/2005 | Yoshimoto | 707/202 |
| 6,928,488 | B1 | 8/2005 | de Jong et al. | 709/246 |
| 6,957,221 | B1 | 10/2005 | Hart et al. | 707/100 |
| 7,010,657 | B2 * | 3/2006 | Lowe et al. | 711/165 |
| 7,039,915 | B2 * | 5/2006 | Kavoori et al. | 718/104 |
| 2002/0023139 | A1 | 2/2002 | Hultgren | 709/216 |
| 2002/0032873 | A1 | 3/2002 | Lordemann et al. | 713/201 |
| 2002/0066051 | A1 | 5/2002 | Hobson et al. | 714/16 |
| 2002/0078028 | A1 * | 6/2002 | Lisanke | 707/1 |
| 2003/0120680 | A1 | 6/2003 | Agrawal et al. | 707/103 R |
| 2003/0158862 | A1 | 8/2003 | Eshel et al. | 707/200 |
| 2003/0217310 | A1 | 11/2003 | Ebsen et al. | 714/42 |
| 2003/0220967 | A1 | 11/2003 | Potter et al. | 709/203 |
| 2004/0015834 | A1 | 1/2004 | Mestre et al. | 717/106 |
| 2004/0025169 | A1 | 2/2004 | Wiser et al. | 719/315 |
| 2004/0064439 | A1 * | 4/2004 | Hinshaw et al. | 707/1 |
| 2004/0133591 | A1 * | 7/2004 | Holenstein et al. | 707/102 |
| 2004/0172390 | A1 | 9/2004 | Srivastava et al. | 707/3 |
| 2005/0010615 | A1 * | 1/2005 | Cypher et al. | 707/201 |
| 2005/0071384 | A1 | 3/2005 | Cotner et al. | 707/200 |
| 2005/0091231 | A1 | 4/2005 | Pal et al. | 707/100 |
| 2005/0289558 | A1 * | 12/2005 | Illowsky et al. | 719/318 |
| 2006/0129600 | A1 | 6/2006 | Ode | 707/104.1 |

OTHER PUBLICATIONS

Sandoz A, "Achieving high availability in a replicated file system by dynamically ordering transactions", INSPEC—3908329; Proceedings. The 10$^{th}$ International Conference on Distributed Computing Systems (Cat. No. 90CH2878-7), pp. 432-439, Published: Los Alamitos, CA, USA, 1990, xxi + 600 pp.

Gronvall G; Westerlund A; Pink S, "The design of a mulicast-based distributed file system", INSPEC—6231025; Operating Systems Review, spec. issue., pp. 251-264, Winter 1998.

Shian Hua Lin; Yueh Min Huang; Chi Nan Chen, "The design of a distributed file server based on distributed shared memory," INSPECT—5005038;1994 International Computer Symposium Conference Proceedings, Pt. vol. 2, pp. 1190-1196 vol. 2, Published: Hsinchu, Taiwan, 1994, 2 vol. Xvi+1310 pp.

* cited by examiner

APPARATUS, SYSTEM, AND METHOD FOR SUSPENDING A REQUEST DURING FILE SERVER SERIALIZATION REINITIALIZATION

BACKGROUND OF THE INVENTION

1. Field of the Invention

This invention relates to file servers and more particularly relates to suspending data access request while reinitializing serialization data in a file server in response to a serialization failure.

2. Description of the Related Art

Serialization of a plurality of data access requests can be extremely complicated for data storage devices that are shared among multiple-processor file system servers. Serialization of the data access requests involves defining which applications are connected to which storage devices, or portions thereof, and what kind of access is provided for each application. For example, some applications are given exclusive access rights for certain write operations, while others may not receive exclusive access. Also, some applications may receive shared access rights for certain read operations on the shared data storage devices. By defining which applications are allowed which type of access at which times, the file system servers are able to prevent many data operation errors that would otherwise occur.

However, serialization techniques are not perfect and a serialization implementation may fail. A serialization failure may occur when read or write access to a requested data file or directory is not made available to a requesting application. For example, a serialization failure may occur when two applications are requesting data access rights to data that is exclusively assigned to the other application.

Figure 1A:
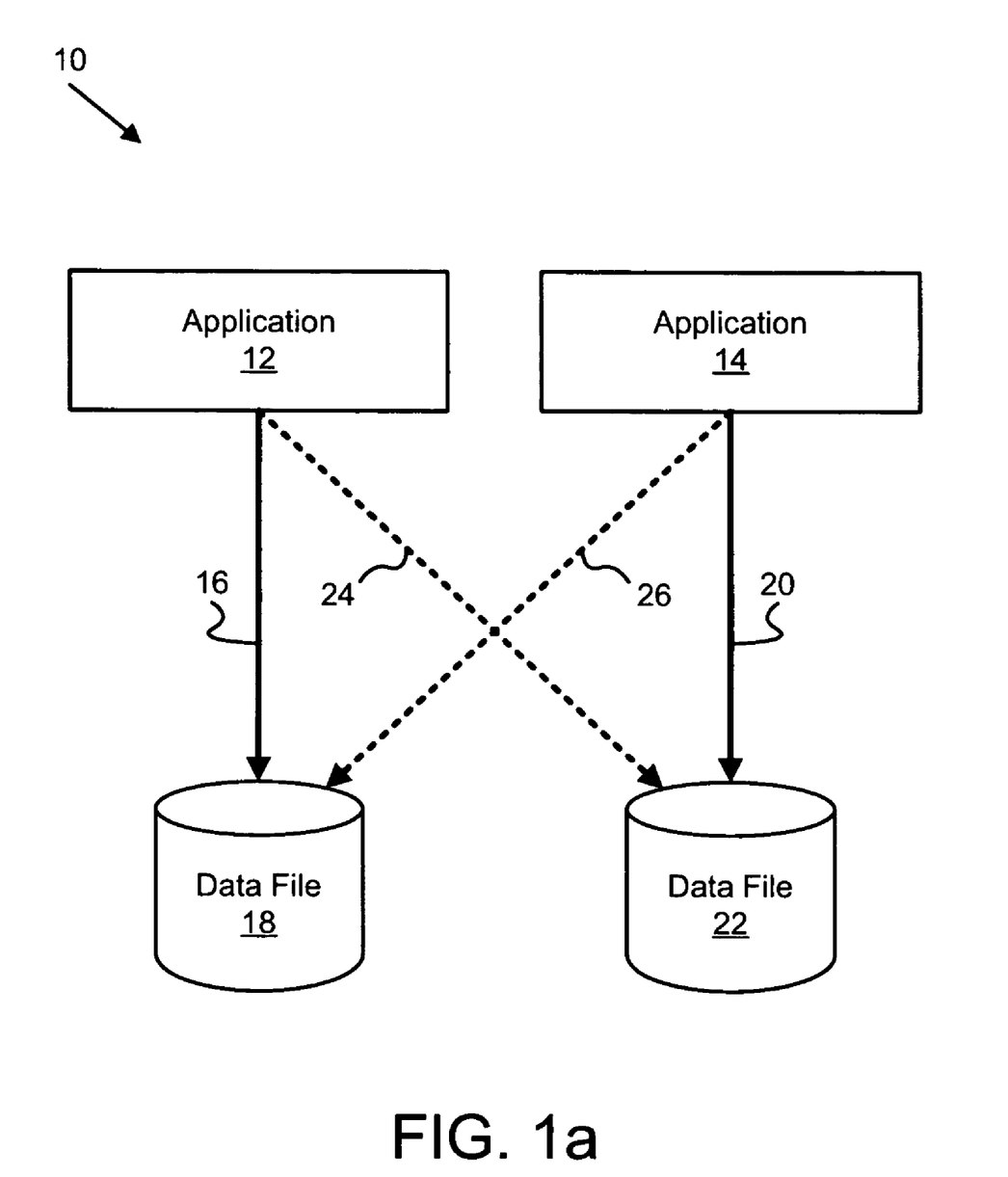
FIG. 1a is a schematic block diagram illustrating one embodiment of an application environment in accordance with the present invention.

FIG. 1a shows one example of an application environment 10 in which a serialization conflict might occur. In particular, the illustrated application environment 10 includes a first application 12 and a second application 14. The first application 12 has exclusive rights (as shown by the solid arrow 16) to a first data file 18. Likewise, the second application 14 has exclusive rights (as shown by the solid arrow 20) to a second data file 22.

FIG. 1a also shows the first application 12 requesting access rights (as shown by the dashed arrow 24) to the second data file 22. Likewise the second application 14 may request access rights (as shown by the dashed arrow 26) to the first data file 22. In this case, a serialization "deadlock" failure occurs when neither the first application 12 nor the second application 14 can progress until the requested access rights are granted, but the requested access rights cannot be granted because the requested data files 18, 22 are already in use by the non-requesting applications 12, 14. When this type of serialization failure occurs, the file system server (not shown) may become nonresponsive and thereby unavailable because the applications 12, 14 continue to hold onto their existing access rights while requesting the additional access rights.

Although an internal serialization failure, by itself, does not compromise either the integrity of the data stored in the data files 18, 22 or the run-time states of the in-flight applications 12, 14, such a serialization failure can have drastic effects on the file system server. For instance, a serious serialization failure may occur where the file system is central to an operating system, such as when the ability to load programs from a file system is necessary for basic operating system functions. Furthermore, serialization failures can result in operating system outages, which can cause the failure of all in-flight application processing, including processing that is not directly related to the corresponding file system. Additionally, serialization failures may lead to excessive costs due to file system server downtime that impacts business-critical applications.

With regard to file system serialization failures, the conventional focus is on correcting the underlying causes of all serialization problems. However, this solution is practically infeasible given the complexity of contemporary multitasking, multiprocessing, and clustering environments in which the number of possible serialization problems and causes is overwhelming.

Because conventional serialization management schemes typically solve serialization failures by restarting the file server, conventional techniques also fail to address how to manage data access requests that are initiated, but cannot be executed, during the reinitialization of the file server. Rather, conventional serialization management schemes allow such requests to fail while the system is down. In other words, all requests, both interruptible application program requests and non-interruptible (not susceptible to hardware interrupts), asynchronous operating system requests, may fail until the file server is restarted.

From the foregoing discussion, it should be apparent that a need exists for an apparatus, system, and method for automatically handling data access requests during reinitialization of serialization data after a file system serialization failure. Beneficially, such an apparatus, system, and method would suspend both interruptible and non-interruptible data access requests while the file system serialization information is reinitialized. Additionally, such an apparatus, system, and method would be advantageous over conventional systems and methods by allowing such data access requests to be processed promptly after the serialization information is reinitialized.

SUMMARY OF THE INVENTION

The present invention has been developed in response to the present state of the art, and in particular, in response to the problems and needs in the art that have not yet been fully solved by currently available file system serialization systems. Accordingly, the present invention has been developed to provide an apparatus, system, and method for suspending a data access request while reinitializing serialization data in a file server that overcome many or all of the above-discussed shortcomings in the art.

The apparatus to suspend a request during file server serialization reinitialization is provided with a logic unit containing a plurality of modules configured to functionally execute the necessary steps of suspending a request during file server serialization reinitialization. These modules in the described embodiments include a request recognition module, an availability module, and a suspension module.

In a further embodiment, the apparatus may be specifically configured to suspend an interruptible data access request that may be subjected to a hardware timer interrupt. For instance, the apparatus may include an interruptible request suspension module and a loop module configured to implement a hardware interrupt delay loop to suspend an interruptible request. In a further embodiment, the hardware interrupt delay loop may be iterative.

In another embodiment, the apparatus may be configured to suspend a non-interruptible data access request, such as an operating system request that may not be subjected to a hardware timer interrupt. For instance, the apparatus may include a non-interruptible request suspension module, a queue module, and a notification module. The queue module may be configured to place the non-interruptible request in a queue until the file server is available to process the request after reinitialization. The notification module may be configured to send an I/O initiation success notification to the requesting operating system, for example, to indicate that the request has been initiated successfully (even though it has only been queued for post-reinitialization processing).

A system of the present invention is also presented to suspend a request during file server serialization reinitialization. The system may be embodied in a file server having a front end module and a back end module. In particular, the system, in one embodiment, includes a front end module, a back end module, and a suspension apparatus. The front end module interfaces with a requesting application or operating system. The back end module interfaces with one or more shared storage devices. The back end module also manages serialization of a data access request to be processed by the file server. The suspension module suspends the data access request during serialization reinitialization of the file server.

In one embodiment, the system may further include an interruptible request suspension module configured to determine that the request is an interruptible request and to put the interruptible request in an iterative delay loop. In a further embodiment, the system may include a non-interruptible request suspension module configured to determine that the request is a non-interruptible request and to send a preemptive initiation success notification to a requesting software program. The non-interruptible request suspension module also may put the non-interruptible request in a request queue to be processed in response to a determination that the file server is unavailable.

A method of the present invention is also presented for suspending a request during file server serialization reinitialization. The method in the disclosed embodiments substantially includes the steps necessary to carry out the functions presented above with respect to the operation of the described apparatus and system. In one embodiment, the method includes recognizing a request to be processed by a file server, determining if the file server is available, and suspending the request in response to a determination that the file server is not available.

In a further embodiment, the method may include determining that the request is an interruptible request, implementing an iterative delay loop based on a hardware interrupt, and placing the interruptible request in the iterative delay loop in response to a determination that the file server is not available. The method also may include monitoring the file server to determine if the file server becomes available, and removing the interruptible request from the iterative delay loop and communicating the interruptible request to the file server in response to a determination that the file server is available.

In a further embodiment, the method may include determining that the request is a non-interruptible request, implementing a request queue, placing the non-interruptible request in the request queue in response to a determination that the file server is not available, and sending a preemptive initiation success notification to a requesting software program. The method also may include monitoring the file server to determine if the file server becomes available, and removing the non-interruptible request from the request queue and communicating the non-interruptible request to the file server in response to a determination that the file server is available.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1B:
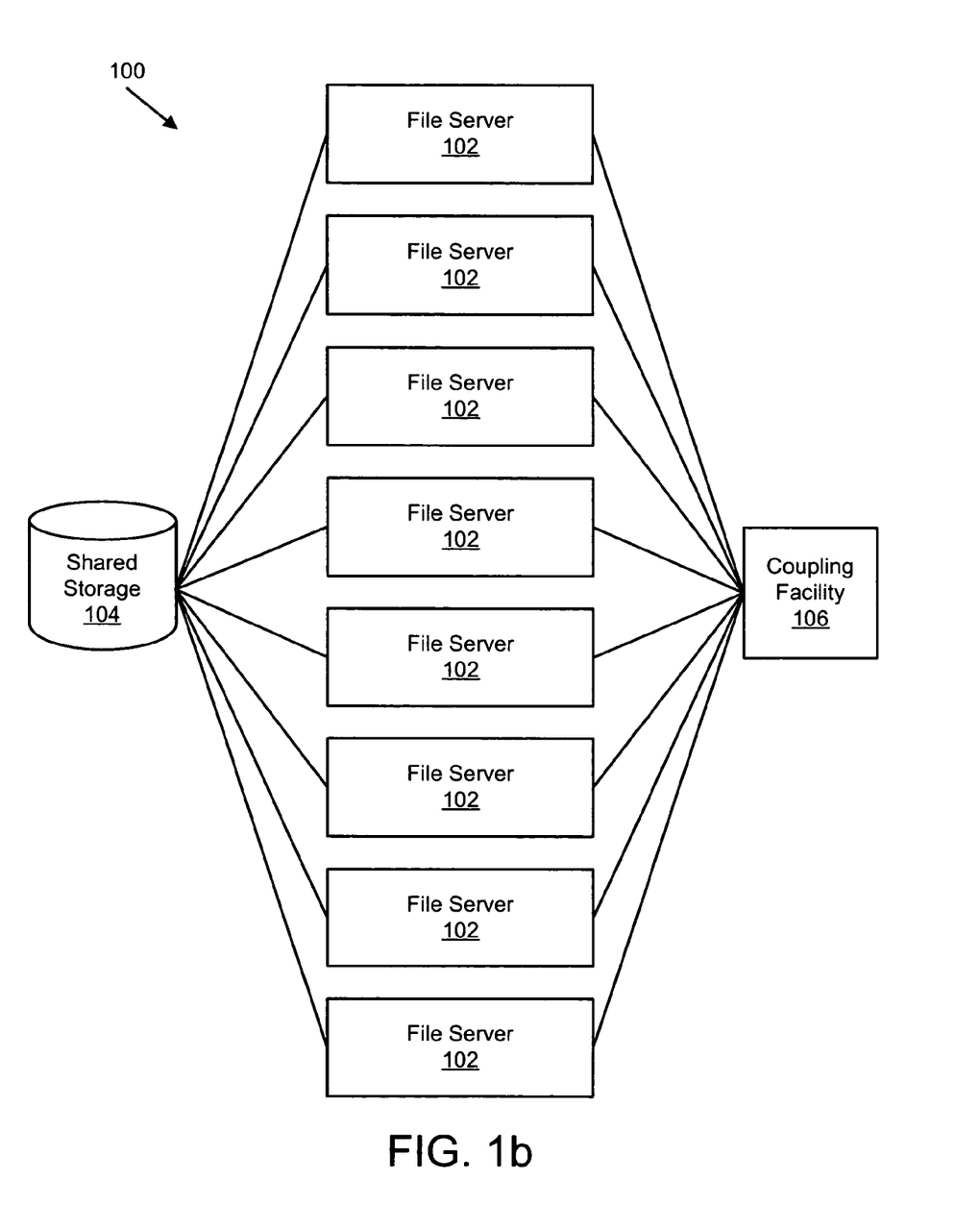
FIG. 1b is a schematic block diagram illustrating one embodiment of a storage system cluster in accordance with the present invention.

FIG. 1b depicts one embodiment of a processing cluster 100 in which certain embodiments of the present invention may be employed. The illustrated processing cluster 100 includes a plurality of file servers 102, one or more shared storage devices 104, and a coupling facility 106. Each file server 102 is configured to manage resources on the processing cluster 100. For example, the plurality of file servers 102 manages allocation of processing, memory, and data storage resources for each application or other software program executing on the processing cluster 100. As used herein, references to an "application" may include application software as well as system software, such as an operating system, unless indicated otherwise.

The shared storage devices 104 comprise electronic storage devices that are configured to store data per instructions from the plurality of file servers 102. In one embodiment, the shared storage devices 104 comprise a plurality of hard disk drives. Alternately, the shared storage devices 104 may comprise one or more optical drives, tape drives, and/or other data storage drives. Data stored on the shared storage devices 104 may be read and otherwise accessed by the file servers 102. In one embodiment, the data on the shared storage devices 104 may be stored within a file system including directories, sub-directories, files, and other directory entries. Each of the directories, sub-directories, files, other directory entries, and similar data structures is a shared storage resource within the processing cluster 100.

Each time an application on one of the file servers 102 requests access to data on one of the shared storage devices 104, the file server 102 coordinates the data access with other client applications running on the same file server 102 and on the other file servers 102 in the processing cluster 100. This coordination is referred to as serialization because the file server 102 allows serial, or consecutive, access to the data on the shared storage 104. Serialization allows each application to have either shared or exclusive access to a particular set of data so that other applications do not interfere with or otherwise disrupt the target set of data.

Serialization may be implemented on various levels of granularity within the processing cluster 100 and shared storage devices 104. For example, serialization may occur at a directory level or a sub-directory level. Additionally, serialization may occur at a file, record, or packet level. The serialization granularity depends on the type of processing cluster 100, file servers 102, shared data storage devices 104, and other hardware used within the processing cluster 100. The granularity also may depend on the type of data access operations that are requested by an application or an operating system.

The coupling facility 106, in one embodiment, is provided to facilitate serialization among all of the file servers 102 within the processing cluster 100. In particular, the coupling facility 106 may store serialization information and assist in messaging operations among the many file servers 102. Alternate embodiments of the processing cluster 100, however, may perform global serialization without the assistance of a coupling facility 106.

Figure 2:
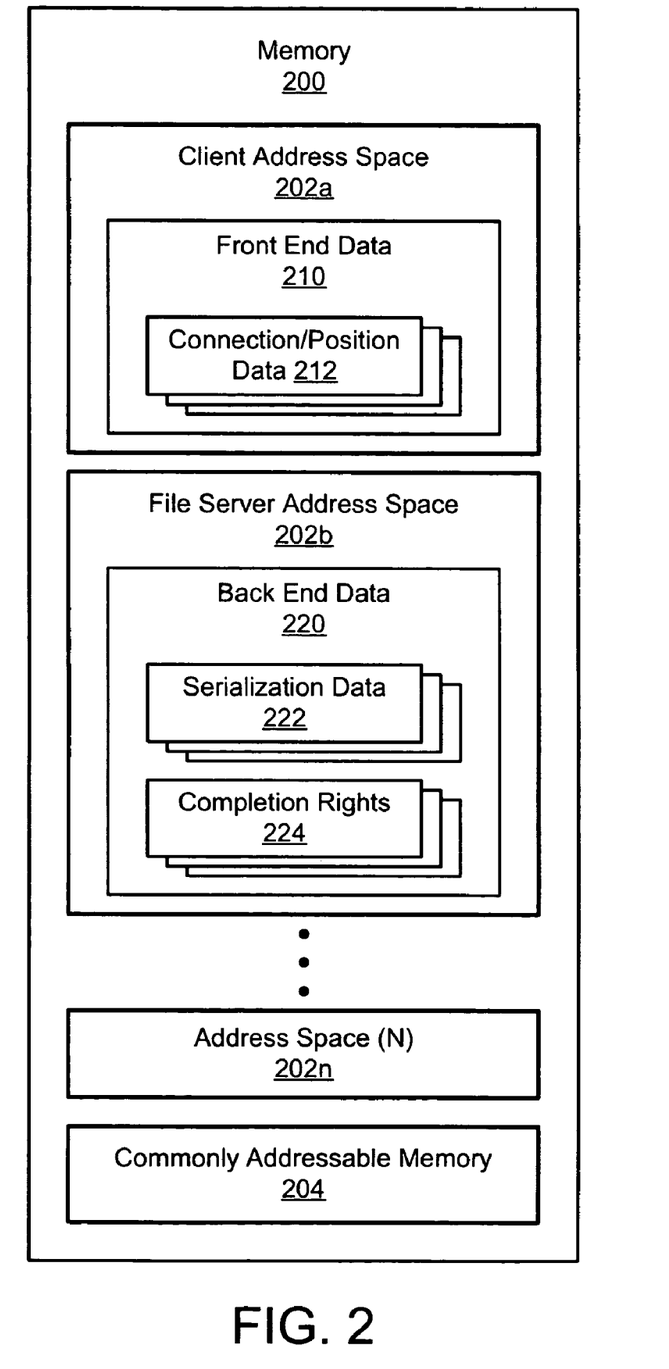
FIG. 2 is a schematic block diagram illustrating one embodiment of an electronic memory device in accordance with the present invention.

FIG. 2 depicts one embodiment of an electronic memory device 200 that may be used to store serialization programs and data, as well as related information. The illustrated memory 200 is divided into a plurality of address spaces 202. Each address space 202 comprises a set of legal memory addresses allocated for a given application and represents the amount of memory 200, either physical or virtual, that is allocated to the application. The illustrated memory 200 specifically includes a client address space 202a, a file server address space 202b, and additional address space(s) 202n. The memory 200 also includes commonly addressable memory 204.

A client address space 202a may be created for each application that interfaces with a given file server 102. For instance, a memory 200 may include four client address spaces 202a, one for each of four clients interfacing with the file server 102. The client address space 202a also may be referred to as the "front end" because it is responsible for interacting directly with the application programs. In general, the client address space 202a facilitates data access operations for the requesting software program, such as application software or system software.

The illustrated client address space 202a includes front end data 210, generally, and specifically includes connection/position data 212. Each client address space 202a may contain corresponding front end data 210, including connection/position data 212, pertinent to the associated client. The connection/position data is descriptive of the data on the shared storage devices 104 that is accessed by the corresponding application. An example of connection/position data 212 is described in more detail with reference to FIG. 3a.

References throughout this description to "a" or "the" client address space 202a in singular form is understood to refer to one or more client address spaces 202a, where each client address space 202a corresponds to an independent client. Similarly, references to front end data 210 and/or connection/position data 212 is understood to refer to such data for one or more clients interfacing with a given file server 102.

The file server address space 202b, in one embodiment, is responsible for serialization within the file server 102 and for data access to the shared storage devices 104. The file server address space 202b also may be referred to as the "back end" because it manages the interface between the file server 102 and the shared storage devices 104. In particular, the file server address space 202b serializes the data access requests for the application corresponding to the associated client address space 202a. These data access requests are serialized with other data access requests from other applications serviced by the same file server 102 and other file servers 102 within the processing cluster 100.

The illustrated file server address space 202b includes back end data 220, generally, and specifically includes serialization data 222. In further embodiments, the back end data 220 also may include completion rights 224, which may indicate the processing status of a data access request and/or the stability of the connection/position data 212 stored in the client address space 202a.

The additional address space(s) 202n may be used for similar programs and data as those stored in the client address space 202a and the file server address space 202b. The additional address space(s) 202n also may include a master address space, and so forth, as is currently known in the art.

The commonly addressable memory 204 is a portion of the memory 200 that may be used to store programs and data that are commonly accessible by one or more address spaces 202. For instance, the commonly addressable memory 204 may be used to store data, such as file names, or metadata that is commonly referenced by both the connection/position data 212 in the client address space 202a and the serialization data 222 in the file server address space 202b.

Figure 3A:
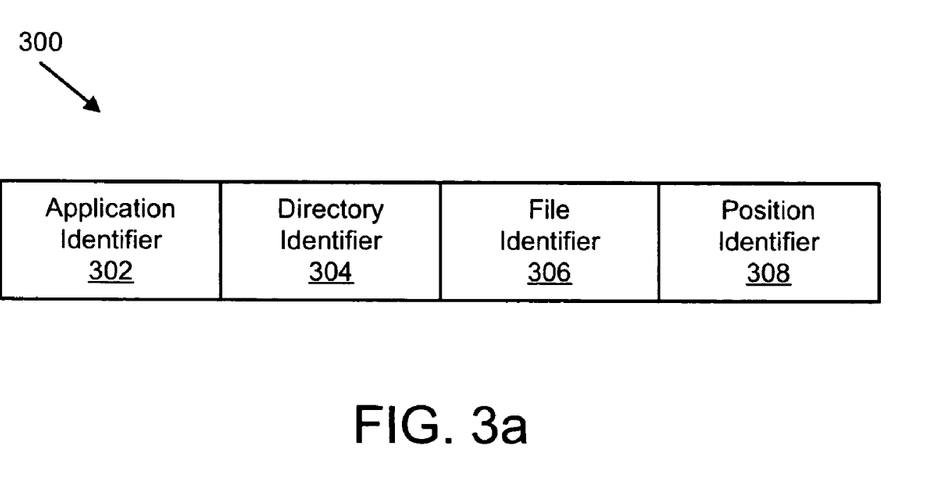
FIG. 3a is a schematic block diagram illustrating one embodiment of connection/position data in accordance with the present invention.

FIG. 3a depicts one embodiment of connection/position data 300 that is substantially similar to the connection/position data 212 described with reference to FIG. 2. The connection/position data 300 includes several fields that are each configured to store an identifier or other data to describe the connection and position information that is associated with a data access request corresponding to a particular application. The connection/position data 300 also may be referred to herein as connection/position information or connection/position records.

The illustrated connection/position data 300 includes an application identifier field 302, a directory identifier field 304, a file identifier field 306, and a position identifier field 308. In a further embodiment, the connection/position data 300 may include fewer or more data and/or metadata fields. In one embodiment, the application identifier field 302 stores an application identifier that identifies the application for which the client address space 202a exists.

The directory identifier field 304 stores a directory identifier that identifies a directory on the shared storage devices 104 that is being used for operations associated with the application identified by the application identifier. Similarly, the file identifier field 306 stores a file identifier that identifies a file that is being used for data access operations associated with the same application. In certain embodiments, the file identifier may relate to the directory identifier in that the file is a member of the directory. Given this relationship, the file identifier also may be referred to as a member identifier. The directory identifier and the file identifier may generally be referred to as resource identifiers. In alternate embodiments of the invention, other resource identifier fields and resource identifiers may be present within the connection/position data 300.

The position identifier field 308, in one embodiment, stores a position identifier that identifies the position at which the file or storage resource is currently or most recently accessed. In one embodiment, the position identifier may comprise a byte offset that indicates the current read or write position by a number of bytes from the beginning of the file that is being accessed.

Figure 3B:
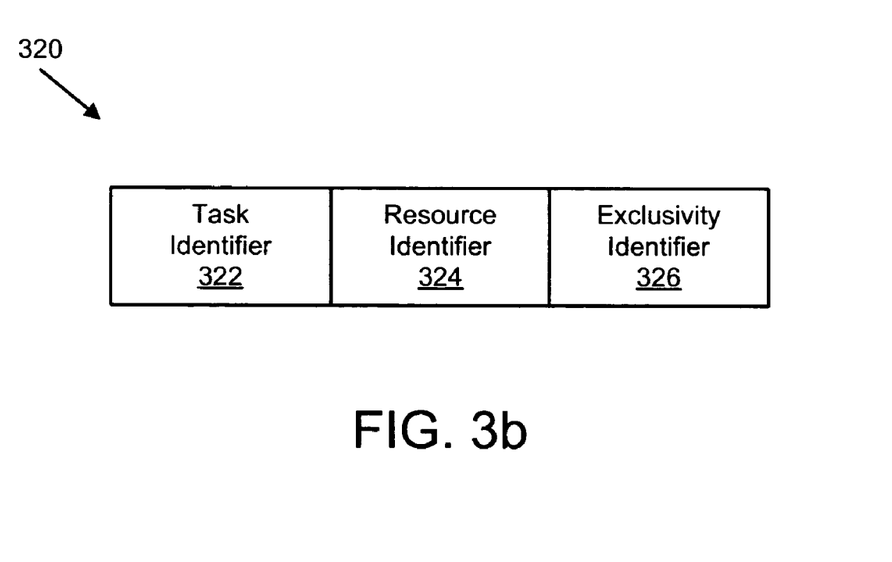
FIG. 3b is a schematic block diagram illustrating one embodiment of serialization data in accordance with the present invention.

FIG. 3b depicts one embodiment of serialization data 320 that is substantially similar to the serialization data 222 described above with reference to FIG. 2. The serialization data 320 includes several fields that are each configured to store an identifier or other data to describe the serialization information that is associated with a data access request corresponding to a particular task. A task is one data access operation that is associated with a particular application. An application may generate one or many tasks. The serialization data 320 also may be referred to herein as serialization information or serialization records.

The illustrated serialization data 320 includes a task identifier field 322, a resource identifier field 324, and an exclusivity identifier field 326. In a further embodiment, the serialization data 320 may include fewer or more data and/or metadata fields. In one embodiment, the task identifier field 322 stores a task identifier that identifies the task that is executed within the file server address space 202b.

In one embodiment, the resource identifier field 324 stores a resource identifier that identifies either an input resource or an output resource associated the task identified by the task identifier. In one embodiment, the resource identifier may identify an input resource, such as a shared storage device 104, from which data may be input into the task operation. For instance, the task operation may read data from a shared storage device 104. In a further embodiment, the resource identifier may identify an output resource, such as a buffer, to which data may be sent according to the task operation.

The exclusivity identifier field 326 stores an exclusivity identifier that identifies the type of resource exclusivity provided for the identified task to the identifier resource. For example, the task may have either shared or exclusive read access to a target data set to be read from the shared storage devices 104. In many instances, though not all, the exclusivity identifier provides shared access for data read (input) operations. In a further example, the task may have exclusive write access to a target buffer on which data may be written. In many instances, though not all, the exclusivity identifier provides exclusive access for data write (output) operations.

Figure 4:
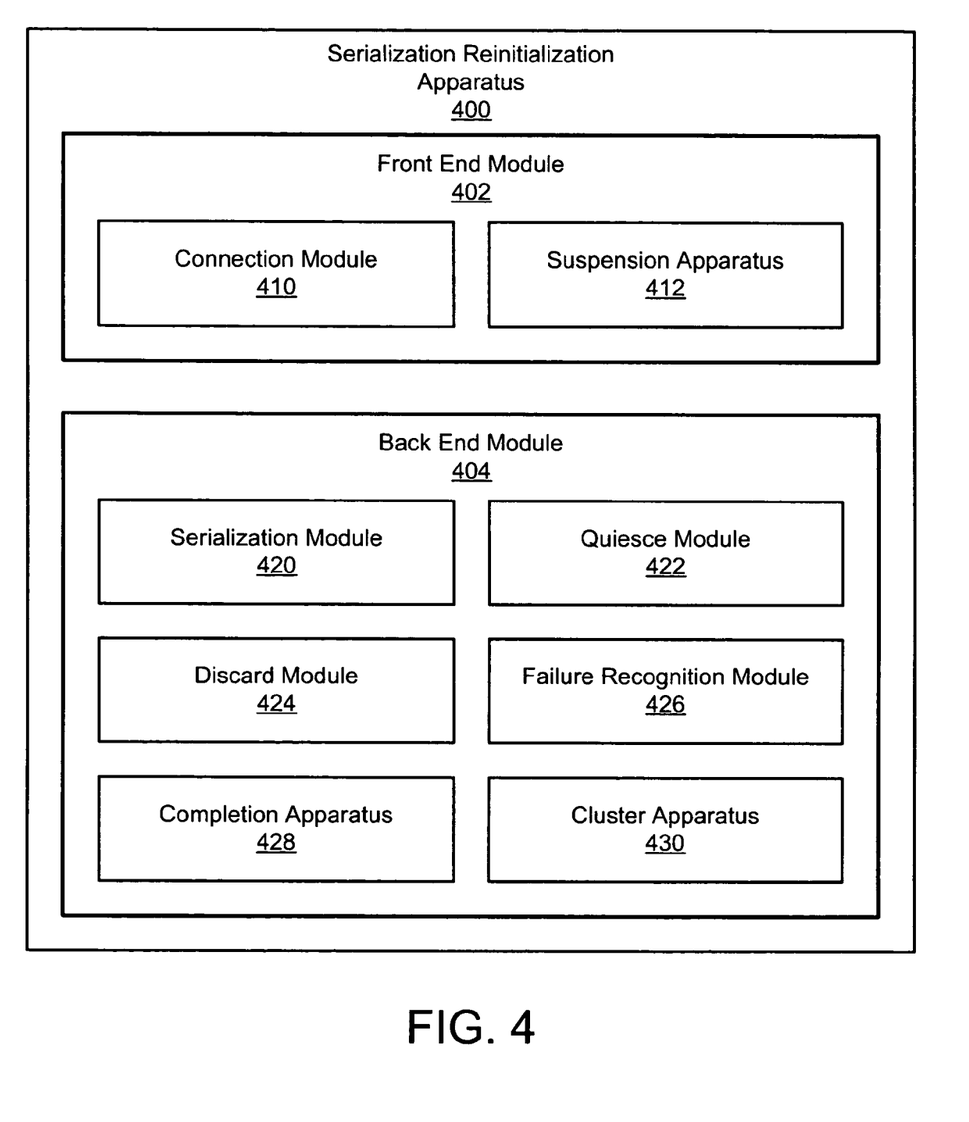
FIG. 4 is a schematic block diagram illustrating one embodiment of a serialization reinitialization apparatus in accordance with the present invention.

FIG. 4 depicts one embodiment of a serialization reinitialization apparatus 400 that may be used in conjunction with various embodiments of the present invention. The illustrated serialization reinitialization apparatus 400 includes a front end module 402 and a back end module 404. In one embodiment, the front end module 402 and the back end module 404 are software programs that reside in the client address space 202a and file server address space 202b, respectively.

The serialization reinitialization apparatus 400 is configured to reinitialize the serialization data 222 of the file server 102 in response to a serialization error or failure. As described above, a serialization failure may occur when one or more applications cannot properly access stored data that is necessary for completion of an operation. For example, referring back to FIG. 1, a file server 102 may be waiting for a first application 12 having exclusive access rights to a data file 18 to conclude an operation before allowing a second application 14 to have access rights to the same data file 18.

When serialization data 222 within a file server 102 or among a plurality of file servers 102 within a processing cluster 100 fails, the file server 102 or processing cluster 100 may become unavailable. For example, a file server 102 may become nonresponsive or "deadlocked" when two applications 12, 14 attempt to access data that is exclusively reserved for each other. By reinitializing the serialization data 222 of the file server 102, the serialization reinitialization apparatus 400 discards the existing serialization information 222 and reconstructs new serialization information from the connection/position data 212, thereby correcting any serialization failures.

Referring back to FIG. 4, the front end module 402, in one embodiment, includes a connection module 410 and a suspension apparatus 412. The connection module 410 is configured to monitor and record the connection/position data 212 for each task associated with an application. The suspension apparatus 412 is configured, in one embodiment, to suspend data access requests while the serialization data 222 for the file server 102 is being reinitialized. In one embodiment, the suspension apparatus 412 suspends the data access requests during a quiesce period prior to the serialization reinitialization, as well as during the serialization reinitialization. One example of a suspension apparatus 412 is described in more detail with reference to FIG. 5.

The back end module 404, as illustrated, includes a serialization module 420, a quiesce module 422, a discard module 424, a failure recognition module 426, a completion apparatus 428, and a cluster apparatus 430. The serialization module 420, in one embodiment, is configured to manage the serialization data 222 for the file server 102. Additionally, the serialization module 420 may rebuild the serialization data 222 from the connection/position data 212 in conjunction with a serialization reinitialization of the file server 102.

The quiesce module 422 is configured, in one embodiment, to define and implement a quiesce period prior to a reinitialization of the serialization data 222 of the file server 102. In certain embodiments, the quiesce period may be a few seconds. Alternately, the quiesce period may be longer or shorter than a few seconds. During the quiesce period, the back end module 404 may deny new data access requests from the front end module 402. Additionally, the quiesce period may be used to allow ongoing tasks to complete prior to serialization reinitialization. Furthermore, ongoing tasks may be suspended or otherwise postponed during the quiesce period in order to maintain the integrity of the connection/position data 212 stored in the client address space 202a.

The discard module 424, in one embodiment, is configured to discard the existing serialization data 222 in conjunction with a serialization reinitialization of the file server 102. In certain embodiments, for example, the discard module 424 may request that the operating system simply destroy all of the information, programs, and data stored in the file server address space 202b, or back end. In other words, the operating system may be invoked to delete the back end data 220, including the existing serialization data 222 and the completion rights 224. Furthermore, the operating system may entirely discard the back end module 404, including the serialization module 420, the quiesce module 422, the discard module 424, the failure recognition module 426, the completion apparatus 428, and the cluster apparatus 430. Each of these back end modules, apparatuses, and data may be rebuilt during the serialization reinitialization.

The failure recognition module 426 is configured, in one embodiment, to recognize a serialization failure within the file server 102. In a further embodiment, the failure recognition module 426 may recognize a global serialization failure, for example in conjunction with the coupling facility 106. In an alternate embodiment, a human operator may recognize a situation in which the file server 102 is nonresponsive and explicitly issue a command on a system console keyboard (not shown) to initiate the reinitialization process. In this case, the operator may use diagnostic aids to help make such a determination.

The completion apparatus 428 is configured, in one embodiment, to track the completion progress of a task. In one embodiment, the completion apparatus 428 may create and use the completions rights 224 within the back end data 220 to track the progress of a task. The cluster apparatus 430, in one embodiment, is configured to manage communication and operations of the processing cluster 100 during serialization reinitialization of one of the plurality of file servers 102.

Figure 5:
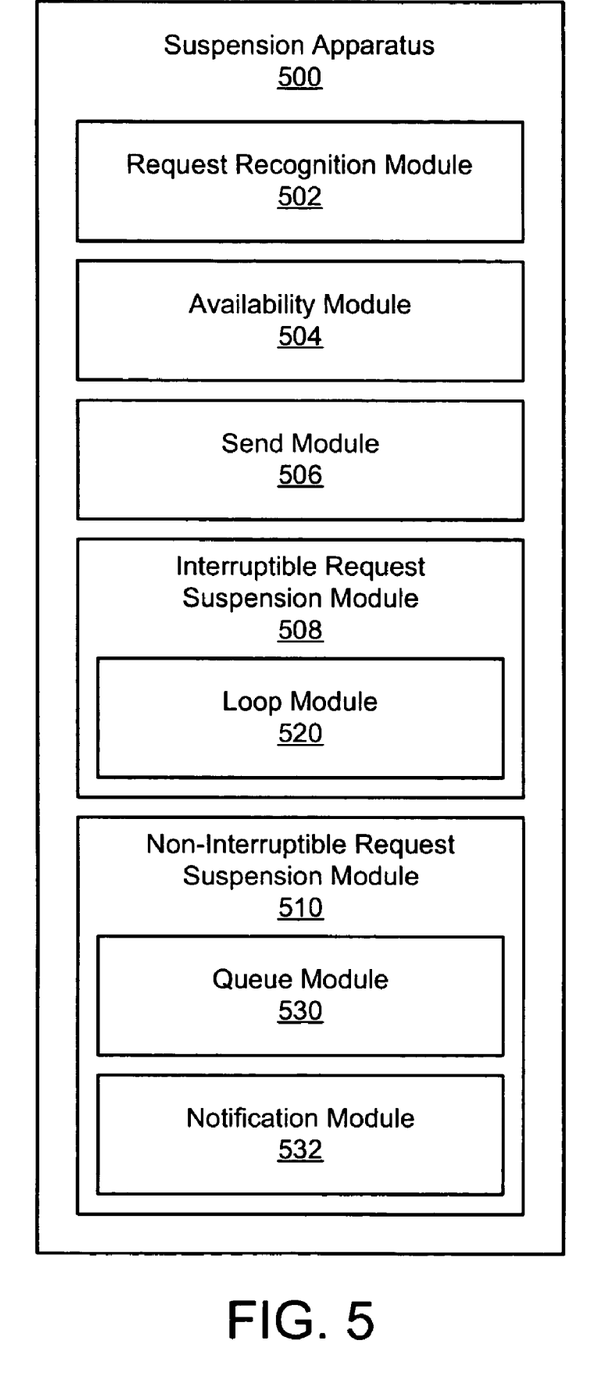
FIG. 5 is a schematic block diagram illustrating one embodiment of a suspension apparatus in accordance with the present invention.

FIG. 5 depicts one embodiment of a suspension apparatus 500 that is given by way of example of the suspension apparatus 412 shown in FIG. 4. As described above, the suspension apparatus 500 suspends data access requests while the serialization data 222 for the file server 102 is being reinitialized. The illustrated suspension apparatus 500 includes a request recognition module 502, an availability module 504, a send module 506, an interruptible request suspension module 508, and a non-interruptible request suspension module 510. In one embodiment, the interruptible request suspension module 508 includes a loop module 520. In a further embodiment, the non-interruptible request suspension module 510 includes a queue module 530 and a notification module 532.

The request recognition module 502, in one embodiment, recognizes a data access request that is initiated and communicated to the file server 102 during reinitialization of the serialization data 222. In a further embodiment, the request recognition module 502 also recognizes a data access request that is communicated to the file server 102 during the quiesce period described above.

In a still further embodiment, the request recognition module 502 may determine if the data access request is an interruptible data access request or a non-interruptible data access request. For example, an interruptible data access request may be an application program request that can be subjected to a hardware timer interrupt, including many data access requests issued by normal application programs that are not part of the operating system. Alternately, an interruptible data access request may be issued by other application or systems software. In a further example, a non-interruptible data access request may be an asynchronous operating system request that cannot be subjected to a hardware interrupt, including certain critical operating system requests, such as a page-load request resulting from a page exception in a virtual memory system. Alternately, a non-interruptible data access request may be issued by other application or systems software.

The availability module 504, in one embodiment, determines if the file server 102 is available to service the data access request. For instance, the availability module 504 may determine that the file server 102 is unavailable during reinitialization of the serialization data 222. Similarly, the availability module 504 may determine that the file server 102 is unavailable during the quiesce period prior to reinitialization of the serialization data 222. The send module 506, in one embodiment, communicates a previously suspended request to the file server 102 in response to a determination that the file server 102 is available.

The interruptible request suspension module 508 and non-interruptible request suspension module 510, generally, suspend a corresponding data access request during serialization reinitialization until the file server 102 is available to process the request. In one embodiment, the suspension apparatus 500 invokes the interruptible request suspension module 508 and the loop module 520 to suspend an interruptible data access request by implementing a hardware interrupt delay loop, as described in more detail with reference to FIG. 6. In an alternate embodiment, the suspension apparatus 500 invokes the non-interruptible request suspension module 510, the queue module 530, and the notification module 532 to suspend a non-interruptible data access request by implementing a non-interruptible request queue, as described in more detail with reference to FIG. 7.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbology employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
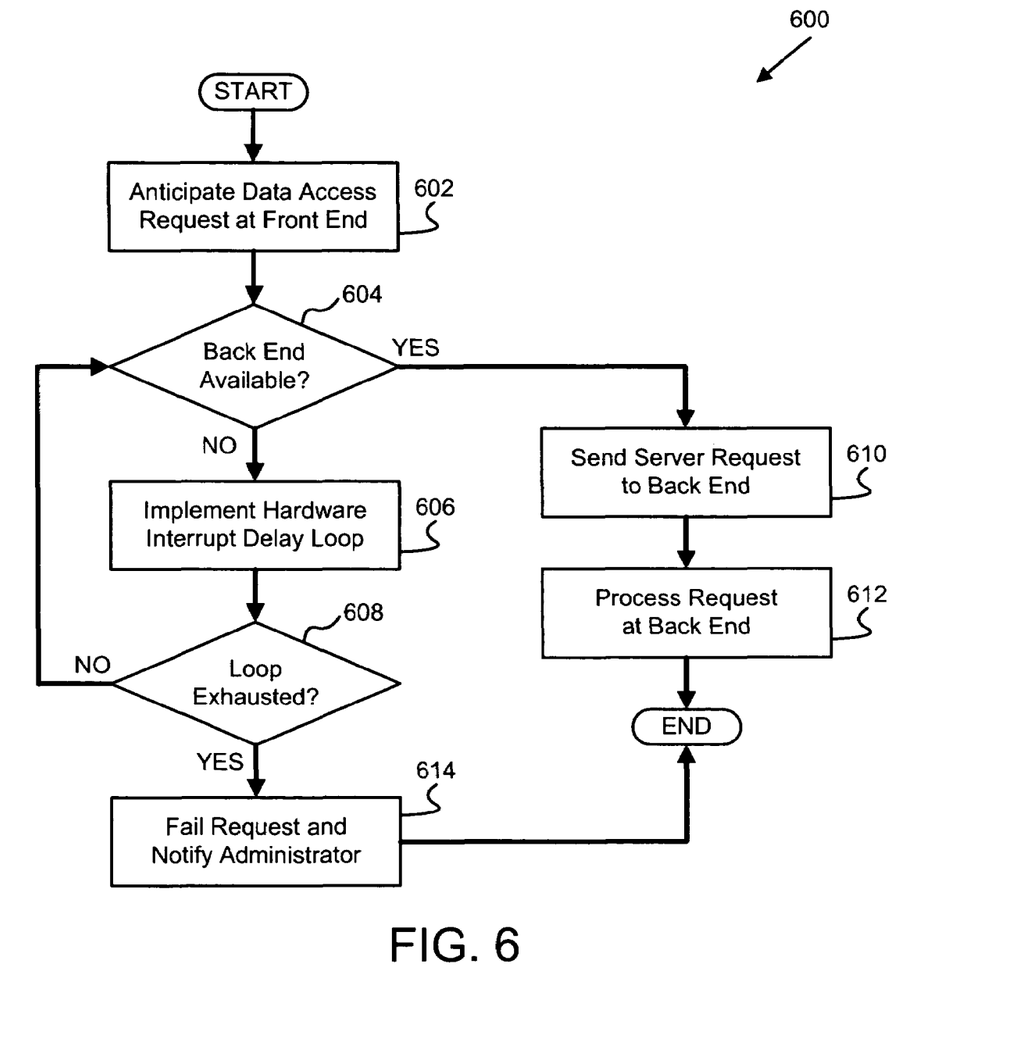
FIG. 6 is a schematic flow chart diagram illustrating one embodiment of an interruptible suspension method in accordance with the present invention.

FIG. 6 depicts one embodiment of an interruptible suspension method 600 that may be implemented by the suspension apparatus 500. As indicated above, the interruptible suspension method 600 acts to delay interruptible data access requests until a new file server 102 is available to process the request. As indicated in FIG. 4, the suspension apparatus 500 may be located in the front end module 402, rather than the back end module 404 because the back end module 404 is destroyed during reinitialization.

The illustrated interruptible suspension method 600 begins when the request recognition module 502 anticipates 602 a data access request that cannot be fulfilled during reinitialization. Additionally, the request recognition module 502 may determine that the request is an interruptible data access request. In one embodiment, anticipating 602 the data access request may include receiving the data access request at the front end module 402. In another embodiment, anticipating 602 the data access request may include receiving a precursor communication that indicates that a data access request will be sent to the front end module 402.

The request cannot be fulfilled during the quiesce period or reinitialization because the back end module 404 and serialization information 222 are unavailable during that time. Without access to stable serialization data 222, the data access cannot be properly coordinated with other data accesses to insure that the data access requests do not result in a conflict.

After the request recognition module 502 anticipates 602 the potential data access request, the availability module 504 determines 604 if the back end module 404 and the serialization module 420 are available to coordinate the data access request. If the back end module 404 and associated modules are unavailable to perform the necessary processing for the data access request, the interruptible request suspension module 508 may invoke the loop module 520 to implement 606 a hardware interrupt delay loop. Although in other embodiments a software queue may be used instead of a hardware interrupt delay loop, the software queue would be subject to potential serialization failures itself. Rather than introduce the possibility of additional serialization failures by way of a software queue, the loop module 520 implements 606 a hardware interrupt delay loop to delay the interruptible data access request.

Limits may be determined and set on how long each hardware interrupt delay loop may delay a single data access request. Additionally, limits may be placed on how many times a request may be subjected to a hardware interrupt delay loop. In one embodiment, the loop module 520 monitors such limits and determines 608 if the loop has been exhausted in one manner or another.

At certain time intervals, the availability module 504 may determine 604 once again if the back end module 404 becomes available. Once the file server 102 is reinitialized and the back end module 404 is available, the send module 506 sends 610 the previously delayed interruptible request to the back end module 404 for serialization and other necessary processing 612, whereupon the interruptible suspension method 600 ends.

However, it is possible that the loop module 520 may determine 408 that the delay loops have been exhausted. For example, the file server 102 may remain unavailable for a certain maximum period of time when the data access request is delayed by the hardware interrupt loop. In this case, the interruptible request suspension module 508 may fail the data access request and notify an administrator of the failure. Alternately, the interruptible request suspension module 508 may first notify an administrator and allow the administrator to determine if the request should be failed or delayed further.

Figure 7:
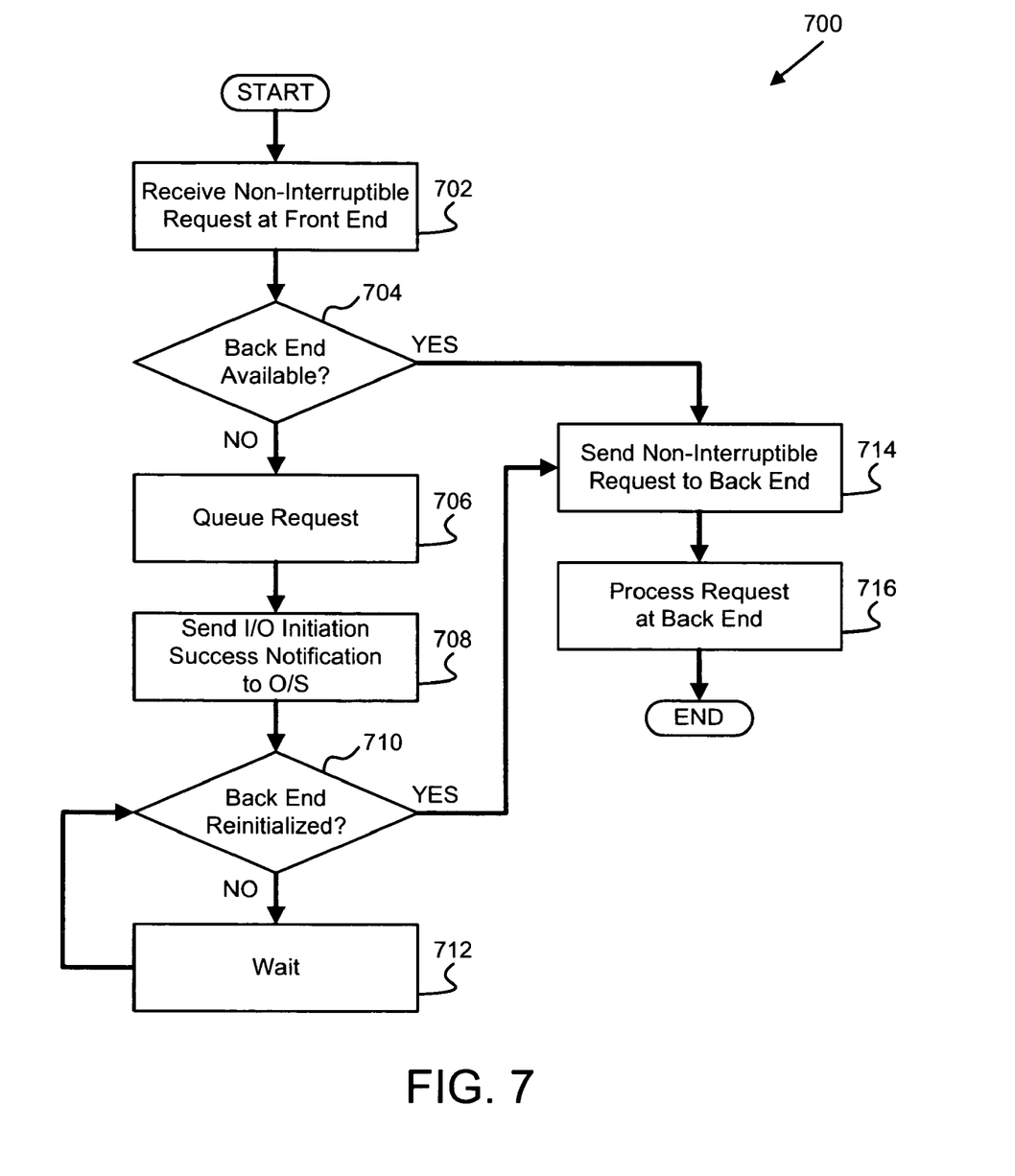
FIG. 7 is a schematic flow chart diagram illustrating one embodiment of a non-interruptible suspension method in accordance with the present invention.

FIG. 7 depicts one embodiment of a non-interruptible suspension method 700 that may be implemented by the suspension apparatus 500. As indicated above, the non-interruptible suspension method 700 acts to delay non-interruptible data access requests, such as from an operating system, until a new file server 102 is available to process the request.

The illustrated non-interruptible suspension method 700 begins when the request recognition module 502 recognizes 702 a non-interruptible data access request at the front end module 402. The availability module 504 then determines 704 if the back end module 404 and associated modules are available to process the non-interruptible request. If the availability module 504 determines that the back end module 404 is not available, the non-interruptible request suspension module 510 invokes the queue module 530, in one embodiment, to queue 706 the non-interruptible request.

The non-interruptible request suspension module 510 then invokes the notification module 532 to send 708 an I/O initiation success notification to the operating system or application that initiated the non-interruptible request. By sending 708 the I/O initiation success notification to the operating system, for example, the non-interruptible request suspension module 510 makes the requesting operating system believe that the non-interruptible request has been received and is currently being processed, even though the request has only been queued for post-initialization processing. In this manner, the operating system simply waits for the request to be processed and any data to be returned to the operating system.

While the operating system waits for the non-interruptible data access request to be processed, even though it may only be queued awaiting actual processing, the availability module 504 determines 610 if the back end module 404 and associated modules are available. If the back end module 404 is still not available, the availability module 504 may wait 512 for a predetermined period of time before again determining 510 if the back end module 404 is available. Once the availability module 504 determines 704, 710 that the back end module 404 is available, the send module 506 sends 714 the previously delayed non-interruptible request to the back end module 404 for serialization and other necessary processing 716, whereupon the non-interruptible suspension method 700 ends.

One advantage of the described embodiments of the present invention is the ability to suspend both interruptible and non-interruptible data access requests while the file system serialization information is reinitialized. Additionally, certain embodiments of the apparatus, system, and method allow such data access requests to be processed promptly after the serialization information is reinitialized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to suspend a request during file server serialization reinitialization, wherein file server serialization defines connections between a plurality of applications and a shared storage device and defines access fights to the shared storage device for at least one of the plurality of applications, the apparatus comprising:

an electronic memory device to store serialization programs and data;

a request recognition module configured to recognize requests to be processed by a file server, the request recognition module being further configured to determine if the requests are interruptible or non-interruptible requests;

an availability module configured to determine if the file server is nonresponsive due to a serialization failure;

a suspension module configured to discard all serialization information existing on the electronic memory device prior to the file server becoming nonresponsive, reconstruct new serialization information after the file server is nonresponsive, and suspend requests initiated after the file server becomes nonresponsive in response to a determination that the file server is nonresponsive due to a serialization failure;

a loop module configured to implement a hardware interrupt delay loop; and a queue module configured to implement a request queue;

wherein the suspension module suspends interruptible requests by invoking the loop module to implement a hardware interrupt delay loop and put the interruptible requests in the hardware interrupt delay loop; and wherein the suspension module suspends non-interruptible requests by invoking the queue module to implement a request queue and put the non-interruptible requests in the request queue.

2. The apparatus of claim 1, further comprising a notification module configured to send request initiation success notification to a requesting software program for non-interruptible requests initiated after the file server becomes nonresponsive.

3. The apparatus of claim 2, wherein the requesting software program is an operating system.

4. The apparatus of claim 1, further comprising a send module configured to communicate the requests to the file server in response to a determination that the file server is available.

5. The apparatus of claim 1, wherein at least one of the requests comprises a non-interruptible request.

6. The apparatus of claim 5, wherein the non-interruptible request comprises a critical operating system request.

7. The apparatus of claim 1, wherein at least one of the requests comprises an interruptible request.

8. The apparatus of claim 7, wherein the interruptible request comprises a non-critical application request.

9. A system to suspend a request during file server serialization reinitialization, wherein file server serialization defines connections between a plurality of applications and a shared storage device and defines access rights to the shared storage device for at least one of the plurality of applications, the system comprising:

an electronic memory device to store serialization programs and data;

a front end module coupled to the electronic memory device, the front end module configured to operate within a client address space and to interface with a client;

a back end module coupled to the electronic memory device, the back end module configured to operate within a file server address space and to manage serialization of data access requests to be processed by a file server;

a suspension module configured to discard the back end module after the file server becomes nonresponsive due to a serialization failure, reconstruct a new back end module after the file server becomes nonresponsive due to a serialization failure, and suspend data access requests initiated during reconstruction of the new back end module in response to a determination that the file server is nonresponsive due to the serialization failure;

a queue module configured to implement a request queue; and a loop module configured to implement a hardware interrupt delay loop;

wherein the suspension module suspends non-interruptible data access requests initiated after the file server becomes nonresponsive by invoking the queue module to implement a request queue and put the non-interruptible data access requests in the request queue; and wherein the suspension module suspends interruptible data access requests initiated after the file server becomes nonresponsive by invoking the loop module to implement a hardware interrupt delay loop and put the interruptible data access requests in the hardware interrupt delay loop.

10. The system of claim 9, wherein the suspension module comprises a non-interruptible request suspension module configured to send a preemptive initiation success notification to a requesting software program for non-interruptible data access requests initiated after the file server becomes nonresponsive.

11. An electronic storage medium tangibly embodying a program of machine-readable instructions executable by a digital processing apparatus to perform operations to suspend a request during file server serialization reinitialization, wherein file server serialization defines connections between a plurality of applications and a shared storage device and defines access rights to the shared storage device for at least one of the plurality of applications, the instructions comprising operations to:

recognize a request to be processed by a file server as one of an interruptible request and a non-interruptible request;

determine if the file server is nonresponsive and unavailable to process the request due to a serialization failure;

discard all serialization information existing prior to the file server becoming nonresponsive in response to a determination that the file server is nonresponsive and unavailable to process the request due to a serialization failure;

reconstruct new serialization information to replace the discarded serialization information in response to a determination that the file server is nonresponsive and unavailable to process the request due to a serialization failure; and suspend the request if initiated after the file server becomes nonresponsive in response to a determination that the file server is nonresponsive and unavailable to process the request due to a serialization failure;

wherein suspending the request comprises putting the request in a hardware interrupt delay loop if the request is an interruptible request and putting the request in a request queue if the request is a non-interruptible request.

12. The electronic storage medium of claim 11, wherein the instructions further comprise operations to send an initiation success notification to a requesting software program in response to a determination that the request is a non-interruptible request.

13. The electronic storage medium of claim 12, wherein the requesting software program is an operating system.

14. The electronic storage medium of claim 11, wherein the instructions further comprise operations to communicate the request to the file server in response to a determination that the file server is available.

15. A method for suspending a request during file server serialization reinitialization, wherein file server serialization defines connections between a plurality of applications and a shared storage device and defines access rights to the shared storage device for at least one of the plurality of applications, the method comprising:

recognizing a request to be processed by a file server as one of an interruptible request and a non-interruptible request;

determining if the file server is nonresponsive due to a serialization failure;

discarding all serialization information existing prior to the file server becoming nonresponsive in response to a determination that the file server is nonresponsive due to a serialization failure; and suspending the request if initiated after the file server becomes nonresponsive in response to a determination that the file server is nonresponsive due to a serialization failure;

wherein suspending the request comprises putting the request in a hardware interrupt delay loop if the request is an interruptible request and putting the request in a request queue if the request is a non-interruptible request.

16. A method for suspending a request during file server serialization reinitialization, wherein file server serialization defines connections between a plurality of applications and a shared storage device and defines access rights to the shared storage device for at least one of the plurality of applications, the method comprising:

recognizing a request to be processed by a file server;

determining that the request is an interruptible request;

determining if the file server is nonresponsive due to a serialization failure;

implementing an iterative delay loop based on a hardware interrupt;

placing the interruptible request in a hardware interrupt delay loop if the interruptible request is initiated after the file server becomes nonresponsive in response to a determination that the file server is nonresponsive due to a serialization failure;

monitoring the file server to determine if the file server becomes available after being nonresponsive; and removing the interruptible request from the hardware interrupt delay loop and communicating the interruptible request to the file server in response to a determination that the file server is not nonresponsive after a serialization reinitialization performed after the file server is nonresponsive.

17. A method for suspending a request during file server serialization reinitialization, wherein file server serialization defines connections between a plurality of applications and a shared storage device and defines access rights to the shared storage device for at least one of the plurality of applications, the method comprising:

recognizing a request to be processed by a file server;

determining that the request is a non-interruptible request;

determining if the file server is nonresponsive due to a serialization failure;

implementing a request queue;

placing the non-interruptible request in the request queue if the non-interruptible request is initiated after the file server becomes nonresponsive in response to a determination that the file server is nonresponsive due to a serialization failure;

sending a preemptive initiation success notification to a requesting software program;

monitoring the file server to determine if the file server becomes available after being nonresponsive; and removing the non-interruptible request from the request queue and communicating the non-interruptible request to the file server in response to a determination that the file server is not nonresponsive after a serialization reinitialization performed after the file server is nonresponsive.

18. An apparatus to suspend a request during file server serialization reinitialization, wherein file server serialization defines connections between a plurality of applications and a shared storage device and defines access rights to the shared storage device for at least one of the plurality of applications, the apparatus comprising:

means for recognizing a request to be processed by a file server;

means for determining if the file server is nonresponsive due to a serialization failure;

means for discarding all serialization information existing prior to the file server becoming nonresponsive in response to a determination that the file server is nonresponsive due to a serialization failure; and means for suspending the request if initiated after the file server becomes nonresponsive in response to a determination that the file server is nonresponsive due to a serialization failure;

wherein the means for suspending comprises means for putting the request in a hardware interrupt delay loop if the request is an interruptible request and means for putting the request in a request queue if the request is a non-interruptible request.

* * * * *